(12) United States Patent
Jones et al.

(10) Patent No.: US 6,978,615 B2
(45) Date of Patent: Dec. 27, 2005

(54) HIGH EFFICIENCY TURBOCHARGER HAVING SECONDARY WASTEGATE VOLUTE

(76) Inventors: Gregg A. Jones, 1406 N. Water St., Owosso, MI (US) 48867; Ryan R. Jones, 1406 N. Water St., Owosso, MI (US) 48867

(*) Notice: Subject to any disclaimer, the term of this patent is extended or adjusted under 35 U.S.C. 154(b) by 0 days.

(21) Appl. No.: 10/863,105

(22) Filed: Jun. 8, 2004

(65) Prior Publication Data
US 2004/0244374 A1  Dec. 9, 2004

Related U.S. Application Data

(60) Provisional application No. 60/476,923, filed on Jun. 9, 2003.

(51) Int. Cl.⁷ .................. F02D 23/00; F02D 29/44; F02B 37/12; F02B 37/18
(52) U.S. Cl. .................................................. 60/602
(58) Field of Search ................................ 60/602

(56) References Cited

U.S. PATENT DOCUMENTS

| | | | | |
|---|---|---|---|---|
| 5,584,181 A | * | 12/1996 | Jinnouchi | 60/602 |
| 5,857,337 A | * | 1/1999 | Kawasaki | 60/602 |
| 6,202,413 B1 | * | 3/2001 | Baker et al. | 60/602 |
| 6,594,995 B2 | * | 7/2003 | Heyes | 60/602 |

* cited by examiner

*Primary Examiner*—Sheldon J Richter
(74) *Attorney, Agent, or Firm*—Bruce H. Johnsonbaugh

(57) ABSTRACT

A turbocharger is provided having a wastegate valve and a first volute for conducting the primary turbine discharge flow stream. The first volute includes a discharge duct causing the primary turbine discharge flow stream to flow in a generally circular pattern as it is exhausted. A secondary volute is provided for conducting wastegate gases, the secondary volute having vanes causing the wastegate gases to flow in a generally circular pattern, matching the pattern of the primary turbine discharge flow stream. When the wastegate gas flow stream combines with the primary turbine discharge flow stream, the flow streams are moving in generally parallel circular pathways so that, when they combine, little or no turbulence is caused, thereby increasing the efficiency of the turbocharger. Increased efficiency translates into fuel economy and power and also improves the flow distribution of exhaust gases to the catalytic converter.

4 Claims, 6 Drawing Sheets

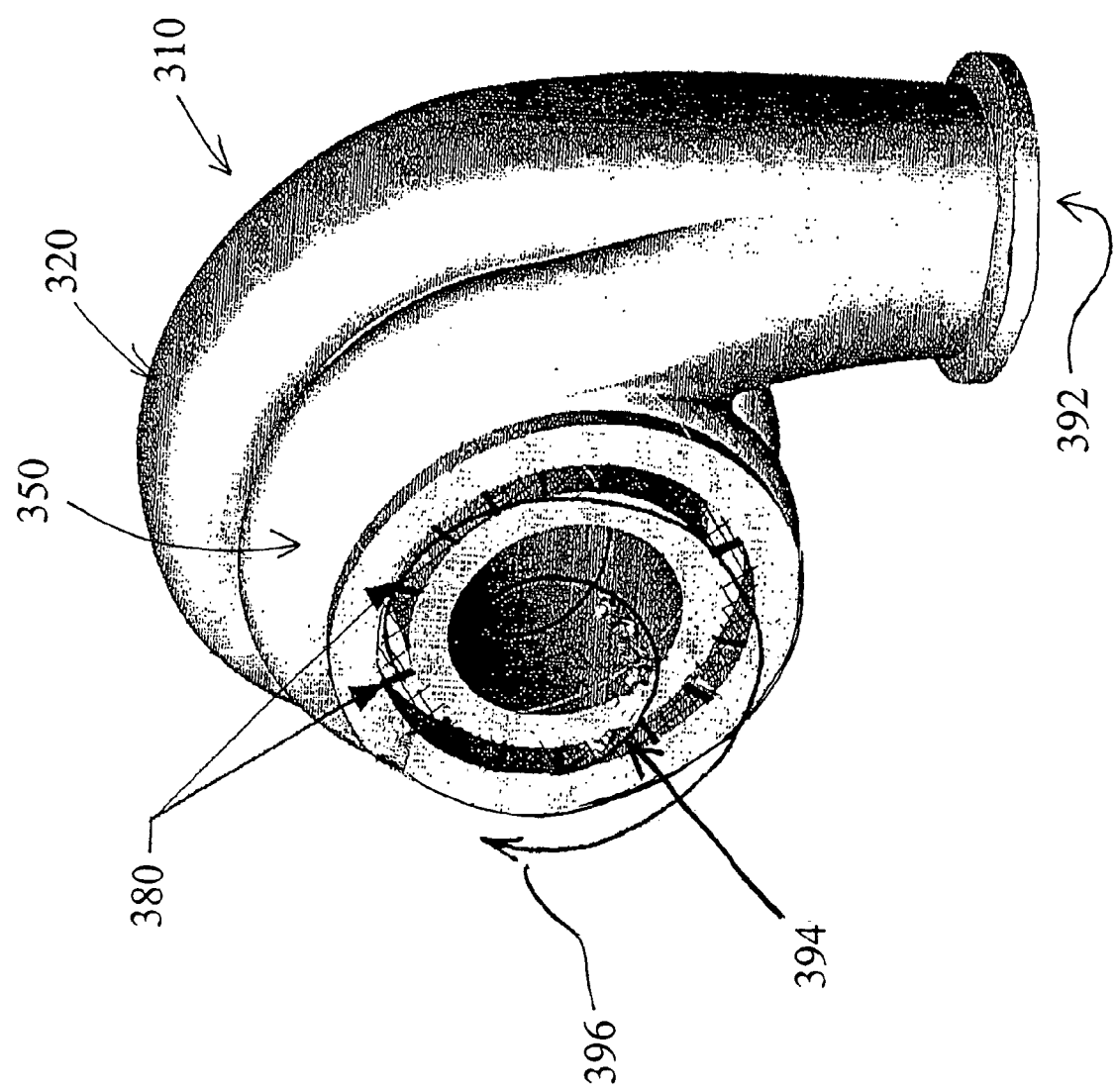

HIGH EFFICIENCY TURBOCHARGER HAVING SECONDARY WASTEGATE VOLUTE

CROSS-REFERENCE TO RELATED APPLICATION

This application claims the benefit of and priority from U.S. provisional application Ser. No. 60/476,923 filed Jun. 9, 2003.

BACKGROUND AND BRIEF SUMMARY OF INVENTION

The present invention relates to turbochargers. In particular, the invention provides increased turbocharger efficiency by reducing turbulence caused by the flow of wastegate discharge gases as those gases enter the primary turbine discharge flow stream of the turbocharger.

Prior art turbochargers typically utilize a wastegate to limit the amount of energy imparted to the turbine by exhaust gases. The wastegate gases bypass the turbine blades in the primary volute and then re-enter the primary turbine discharge flow stream. A significant problem with the prior art is that the wastegate gas flow stream contacts the primary turbine flow stream at right angles, causing turbulence and reducing the overall turbocharger efficiency.

The turbocharger design of the present invention provides a 360° directional matching flow of wastegate discharge gases to the primary turbine discharge flow stream. The two flow streams are moving in parallel, circular paths when they join. The present invention provides, for the first time, a secondary volute for wastegate gases. The secondary volute is designed to match the wastegate flow stream to the primary discharge flow stream. This novel design greatly reduces turbulence and improves turbine efficiency which in turn has significant commercial value in at least two significant respects described below.

A first and primary object of the present invention is to achieve a lower exhaust back pressure between the turbocharger and the engine, thereby improving engine operating efficiency. Improved operating efficiency directly translates into improved fuel economy and power.

A second object of our new turbocharger design is to significantly improve the flow distribution of exhaust gases to the catalytic converter. By equalizing the flow distribution across the exhaust flow stream, our invention provides either an increased catalytic converter life or reduction of the size of the catalytic converter utilized for a given engine, or both. Automotive manufacturers can therefore either extend the service life of the catalytic converter to meet steadily increasing emission standards or they can reduce the cost of the catalytic converter by reducing its size.

Further objects and advantages will become apparent from the following description and drawings.

BRIEF DESCRIPTION OF THE DRAWINGS

FIG. 6 is a perspective view of an alternate embodiment of the invention.

DETAILED DESCRIPTION OF THE DRAWINGS

Figure 1:
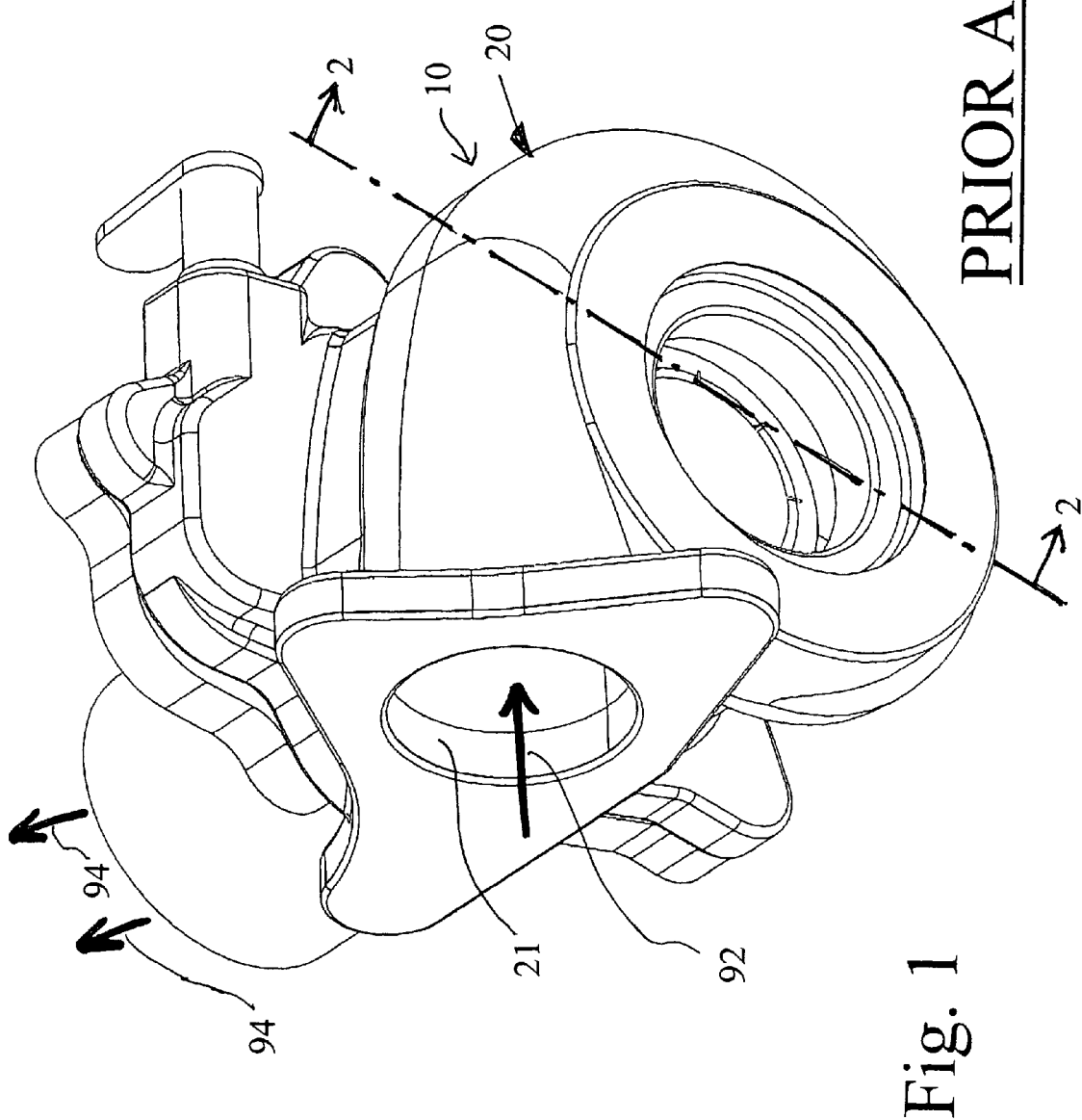
FIG. 1 is a perspective view of a prior art turbocharger.
Figure 2:
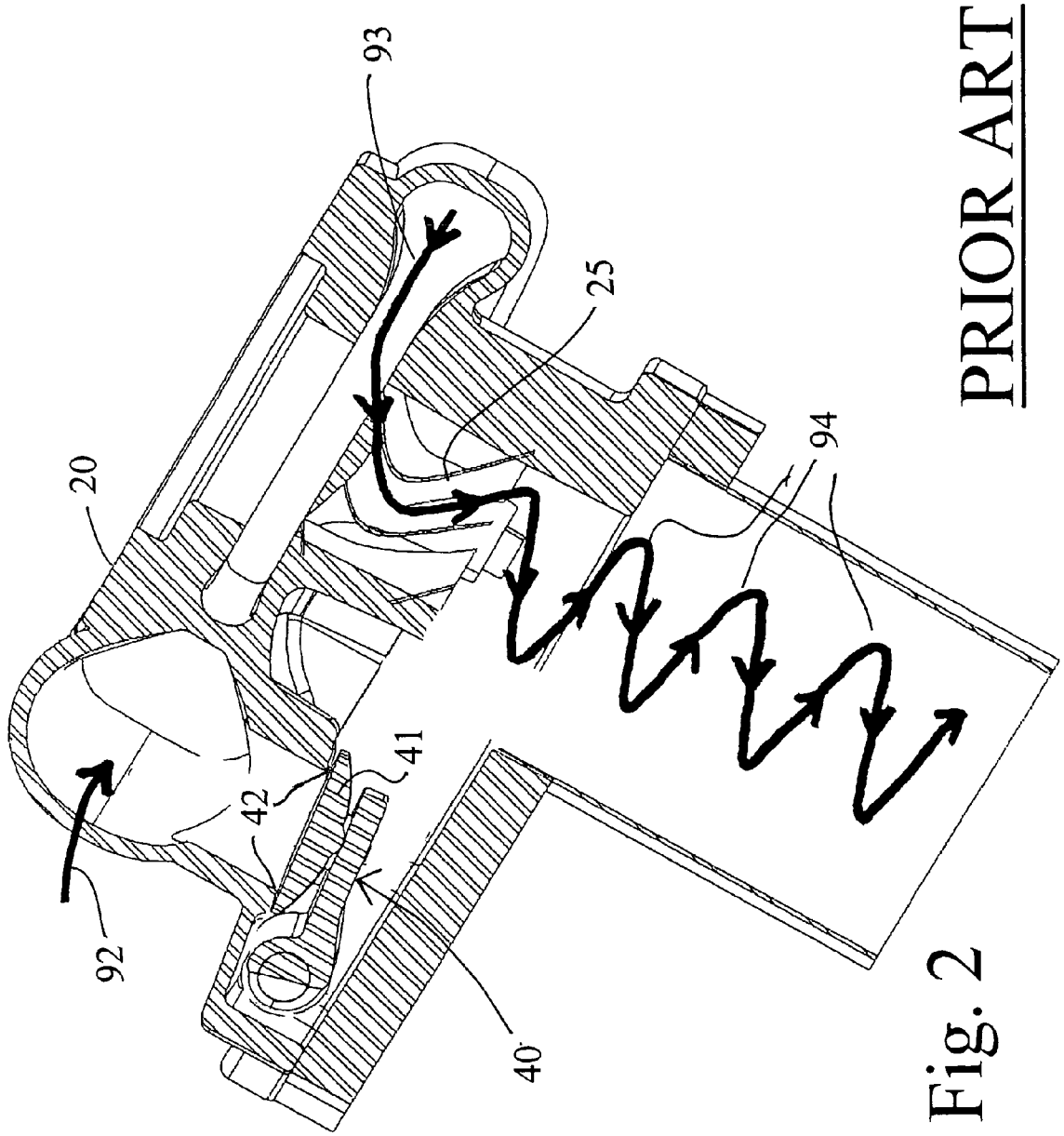
FIG. 2 is a sectional view on the line 2—2 of FIG. 1 with the wastegate valve closed.
Figure 3:
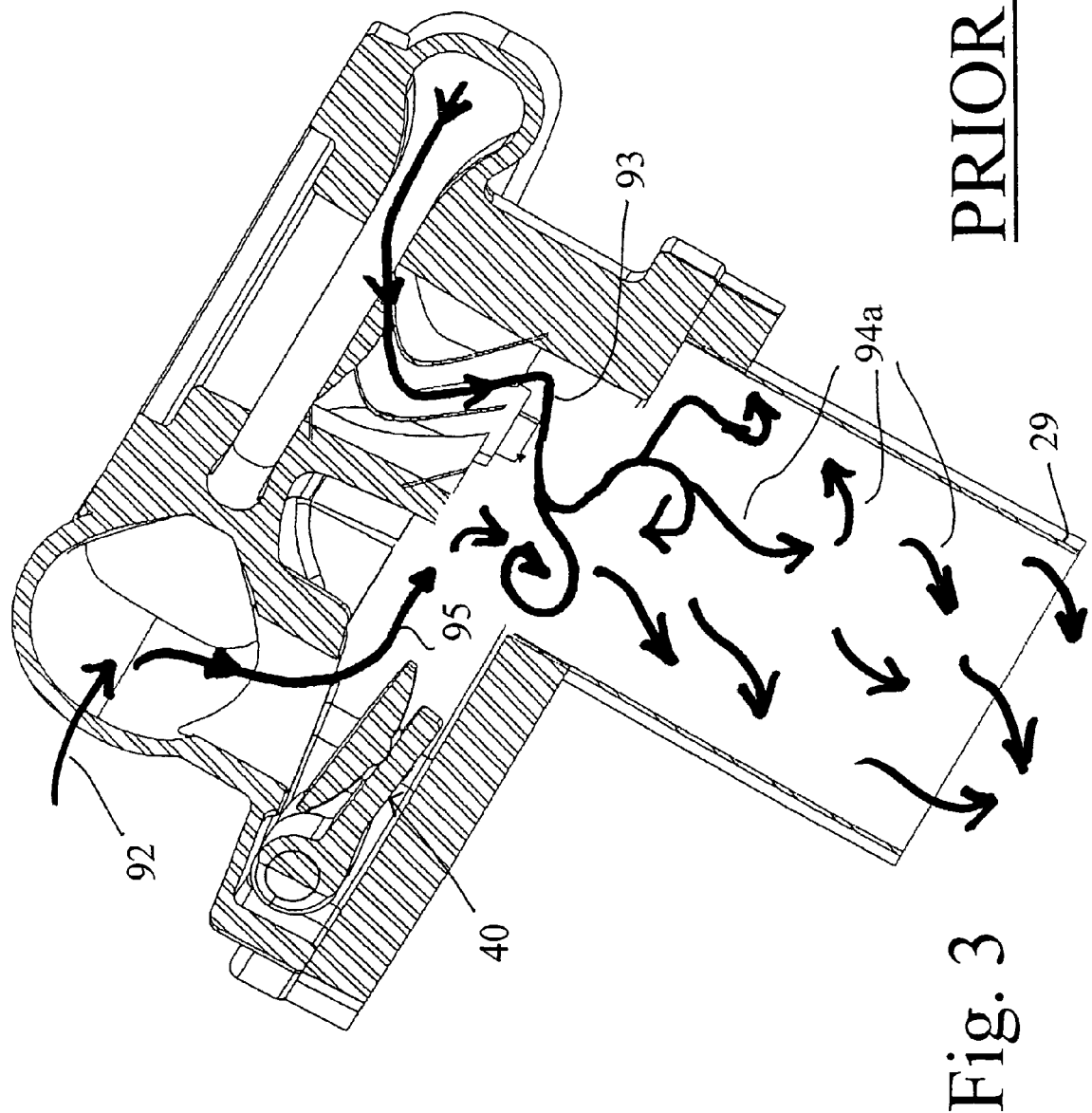
FIG. 3 is the same sectional view as FIG. 2 but with the prior art wastegate valve open.

FIGS. 1–3 illustrate the problem of turbulence and inefficiency in prior art turbochargers caused by the interaction of the primary turbine discharge flow stream and the wastegate flow stream.

As shown best in FIG. 1, a prior art turbocharger shown generally as 10 includes a primary volute 20 which houses turbine blades (not shown in FIGS. 1–3 for clarity). The intake port 21 of volute 20 receives exhaust gases from the engine exhaust, as shown by arrow 92. The exhaust gases entering the turbocharger, as shown by arrow 92, cause the turbine carried within the primary volute 20 to rotate and then the gases are exhausted, as shown by arrows 94.

As shown in FIG. 2, the incoming flow stream of exhaust gases 92 is shown entering primary volute 20 and flowing downwardly perpendicular to the plane of the drawing as illustrated in FIG. 2. The incoming flow stream of exhaust gases 92 causes the turbine blades to rotate as is known in the prior art and then enters the primary turbine discharge chamber 25 in which the primary turbine exhaust flow stream 93 is caused to flow in a generally circular and helical flow stream illustrated as 94.

As shown in FIG. 2, wastegate valve 40 is shown in its closed position wherein the wastegate cap 41 is seated against wastegate outlet 42. In this position of wastegate valve 40, all of the entering exhaust gas flow stream 92 enters the primary volute 20 and transfers its energy to the turbine wheel.

As shown in FIG. 3, wastegate valve 40 has moved to its second or open position in response to increased pressure of the incoming exhaust stream 92. Wastegate gases shown as 95 bypass the turbine wheel and flow toward and collide with the primary turbine exhaust flow stream 93. As shown in FIG. 3, since the pathways of wastegate gas 95 and the primary turbine exhaust flow stream 93 intersect perpendicularly to each other, turbulence is created as shown by arrows 94a. This turbulence significantly reduces the efficiency of prior art turbochagers. This turbulence is the primary problem with prior art turbochargers that is overcome by the present invention.

Figure 4:
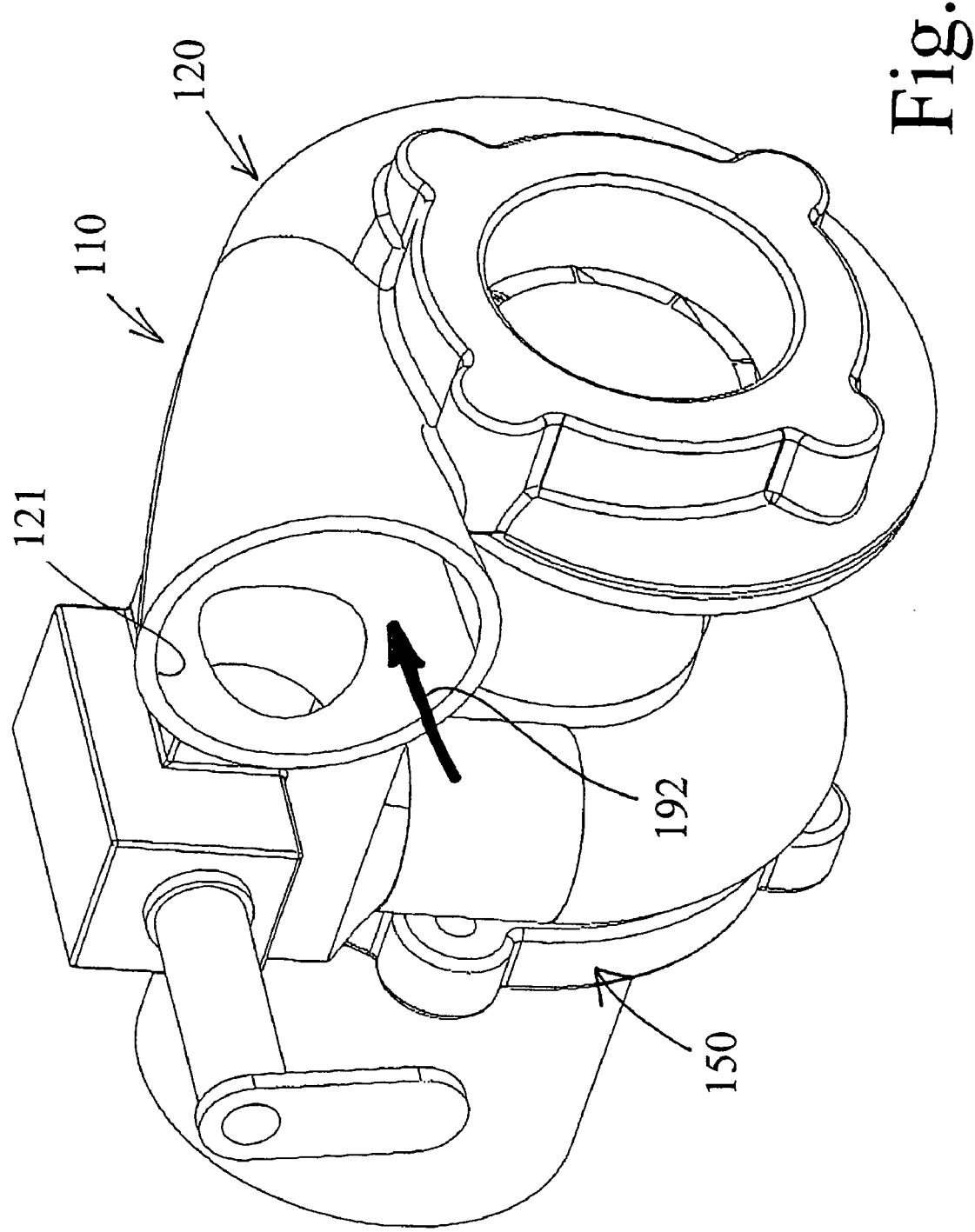
FIG. 4 is a perspective view of the turbocharger of the present invention.
Figure 5:
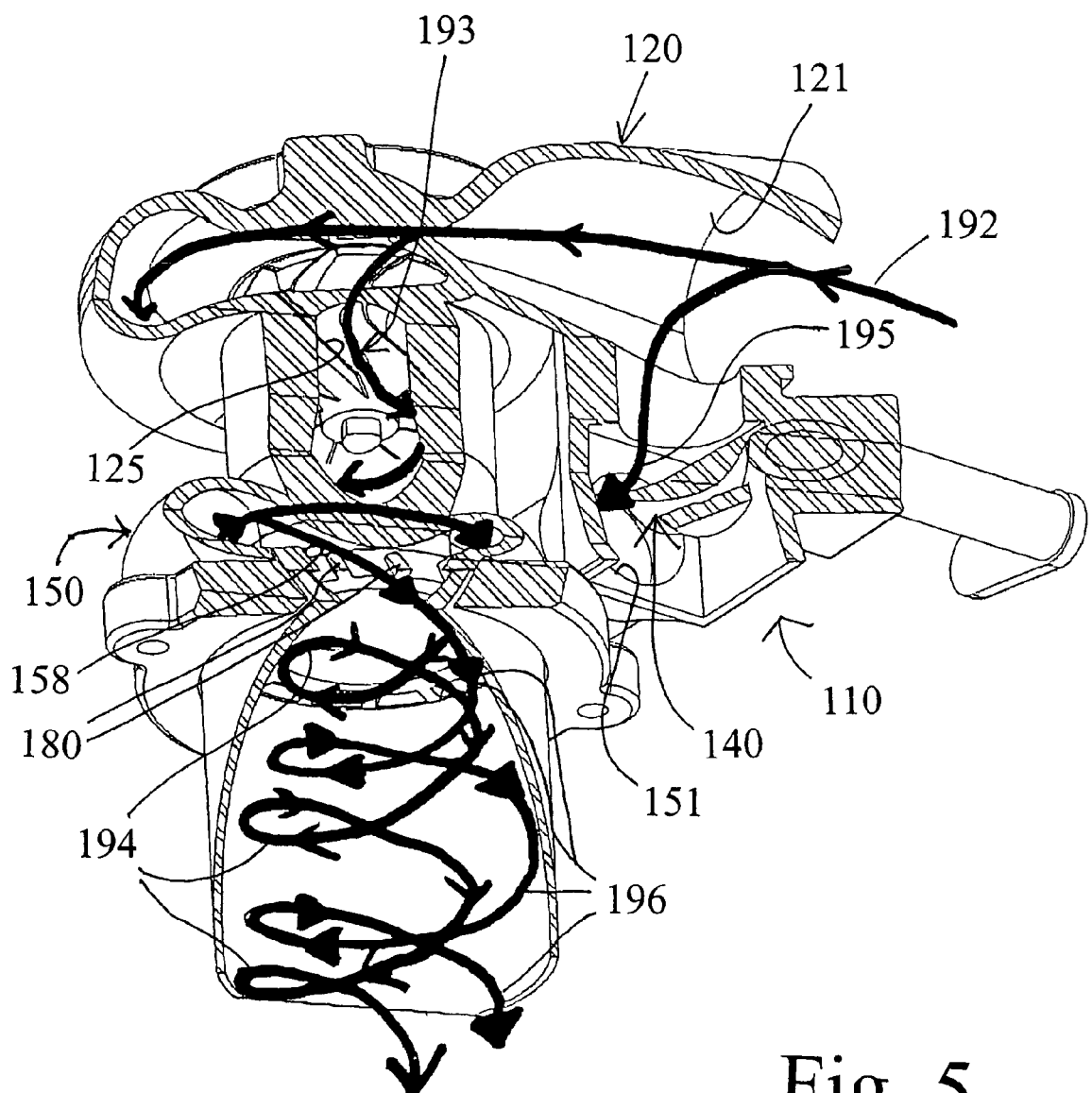
FIG. 5 is a perspective view of the turbocharger of FIG. 4 from the reverse angle shown in FIG. 4, and partially broken away to illustrate the invention.

FIGS. 4 and 5 illustrate the improved turbocharger 110 of the present invention. A primary volute 120 has an intake section 121 into which exhaust flow stream 192 flows. A secondary volute 150 (partially visible in FIG. 4) is provided for conducting the wastegate gases as will be described.

As shown in FIG. 5, the exhaust flow stream 192 enters volute 120 at intake 121 and imparts energy to the turbine wheel (again not shown in the interest of clarity). The primary turbine exhaust flow stream 193 flows through exhaust duct 125. Exhaust duct 125 has a circular and helical design which imparts a circular flow path to the primary turbine discharge flow stream 193 and 194.

In FIG. 5 wastegate valve 140 (shown partially broken away) is shown in its open position, allowing wastegate gases 195 to flow therethrough. In sharp contrast to the prior art, the present invention provides second volute 150 having intake 151 into which wastegate flow stream 195 flows. The secondary volute 150 is designed to impart the identical circular and helical pathway to the wastegate gas flow stream as that imparted to the primary turbine discharge flow stream 194.

An optional feature of the present invention is a plurality of adjustable vanes 180 located downstream of second volute 150. The purpose of adjustable vanes 180 is to match the flow streams of the wastegate gases more precisely with the primary turbine discharge flow stream 194.

As the wastegate flow stream passes through secondary volute 150 and through the exhaust port 158 of secondary volute, it flows between adjustable vanes 180 and is caused to flow in a circular and helical flow stream 196 which matches the pattern of the primary turbine discharge flow stream 194. In this manner, the wastegate gases are directionally matched with the primary turbine exhaust flow stream. The turbulence illustrated in FIG. 3 is essentially eliminated and the efficiency of the turbocharger is significantly increased.

FIGS. 4 and 5 illustrate the location of second volute as spaced axially some distance from primary volute 120. It is also within the scope of this invention to position the secondary volute either immediately adjacent to or concentric with the primary volute. This configuration is illustrated generally in FIG. 6.

FIG. 6 shows an alternate embodiment of the invention wherein the turbocharger 310 has a primary volute 320 and a secondary volute 350 which is concentric with volute 320. The primary turbine exhaust flow stream 394 is shown flowing in a generally circular and helical pathway. The wastegate flow stream 396 flows through secondary volute 350 and exits through vanes 380 whereby it is caused to flow in a generally circular and helical pathway that matches the pathway of the primary turbine discharge flow stream 394.

The primary and secondary volutes of the present invention can be configured to cause their exhaust flow streams to flow either clockwise or counterclockwise provided that both exhaust flow streams of the primary and secondary volutes are directionally matched when they join together.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. In a turbocharger having a wastegate and first volute for conducting the primary turbine discharge flow stream, said first volute causing said primary turbine discharge flow stream to flow in a generally circular pattern as it is exhausted, the improvement comprising:

secondary volute means for conducting wastegate gases, said second volute means causing said wastegate gases to flow in a generally circular pattern matching the pattern of said primary turbine discharge flow stream.

2. A turbocharger, comprising:

first volute means for conducting the primary turbine discharge flow stream and causing said flow stream to flow in a generally circular pattern, secondary volute means for causing said wastegate gases to flow in a generally circular pattern in the same direction as said primary turbine discharge flow stream, means for combining said output flow streams of said first and second volute means so that said flow streams are flowing in generally parallel, circular and matching pathways before they are combined.

3. The apparatus of claim 2 further comprising:

vanes carried by said second volute means for affecting the direction of the flow stream of said wastegate gases.

4. The apparatus of claim 2 wherein said secondary volute means is positioned concentrically inside said first volute means.

* * * * *